United States Patent
Lewis et al.

[11] Patent Number: 6,104,849
[45] Date of Patent: *Aug. 15, 2000

[54] FIBER OPTIC ROTARY JOINT

[75] Inventors: Norris Earl Lewis; Anthony Lee Bowman, both of Christiansburg; Robert Thomas Rogers, Sr., Blacksburg; Michael P. Duncan, Pulaski, all of Va.

[73] Assignee: Litton Systems, Inc., Woodland Hills, Calif.

[*] Notice: This patent is subject to a terminal disclaimer.

[21] Appl. No.: 09/115,946

[22] Filed: Jul. 15, 1998

Related U.S. Application Data

[63] Continuation-in-part of application No. 08/942,721, Oct. 2, 1997, Pat. No. 5,991,478.

[51] Int. Cl.⁷ ..................................................... G02B 6/26
[52] U.S. Cl. ............................................... 385/26; 385/25
[58] Field of Search ........................................ 385/25, 26

[56] References Cited

U.S. PATENT DOCUMENTS

| | | | |
|---|---|---|---|
| 4,109,997 | 8/1978 | Iverson | 385/26 |
| 4,525,025 | 6/1985 | Hohmann et al. | 385/26 |
| 4,555,631 | 11/1985 | Martens | 250/551 |
| 4,643,521 | 2/1987 | Harstead et al. | 385/26 |
| 4,646,086 | 2/1987 | Helzel | 340/870.29 |
| 4,796,183 | 1/1989 | Ermert et al. | 378/10 |
| 5,134,639 | 7/1992 | Vekstein et al. | 378/15 |
| 5,555,334 | 9/1996 | Ohnishi et al. | 385/93 |
| 5,991,478 | 11/1999 | Lewis et al. | 385/26 |

FOREIGN PATENT DOCUMENTS

| | | |
|---|---|---|
| 2441359 | 3/1976 | Germany . |
| 57-138228 | 8/1982 | Japan . |

OTHER PUBLICATIONS

Publication 9702: "New Technologies—In Detail, The Fluorescent Optical Rotary Joint", Schleifring und Apparatebau GmbH, Internet: http://www.schleifring.de/Publication%209702.htm, last updated Apr. 7, 1997.

*Primary Examiner*—John D. Lee
*Attorney, Agent, or Firm*—Lowe Hauptman Gopstein Gilman & Berner

[57] ABSTRACT

Unidirectional and bi-directional fiber optic rotary joints are disclosed for coupling at least one optical signal across a rotary interface. The unidirectional joint includes a stator having a waveguide. A rotor is rotatable through a full 360° revolution and is concentric to the stator. Light transmitters are positioned on a first circumference and connected to one of the stator and the rotor. Each of the transmitters emits an optical signal. Light receivers are positioned on a second circumference and connected to the other one of the stator and the rotor. Each of the transmitted optical signals is emitted tangentially into the waveguide and is reflected in short chordal lengths along the waveguide. Each optical signal is received by at least one of the second plurality of light receivers through the full 360° revolution of the rotor. The number of light receivers is greater than the number of light transmitters. Certain receivers do not receive an optical signal during a portion of the 360° revolution of the rotor.

20 Claims, 7 Drawing Sheets

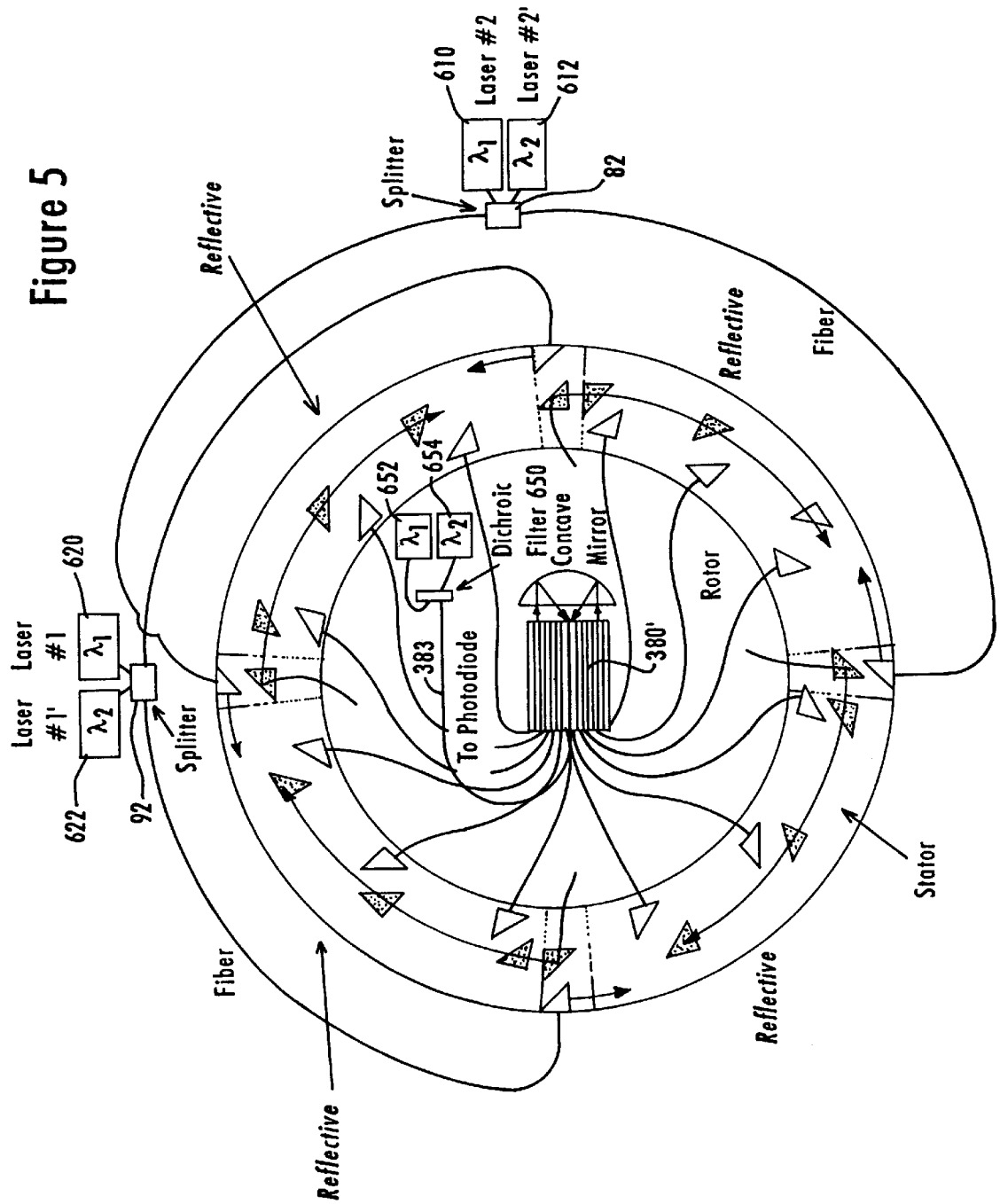

FIBER OPTIC ROTARY JOINT

This application is a continuation-in-part application and claims priority from Ser. No. 08/942,721 filed Oct. 2, 1997, now U.S. Pat. No. 5,991,478, issued Nov. 23, 1999.

TECHNICAL FIELD

The present invention relates generally to fiber optic rotary joints and, more particularly, to contactless fiber optic rotary joints for transmitting high bit-rate signals.

BACKGROUND ART

Devices called fiber optic rotary joints allow optical signals to be transferred between fibers located on rotating and stationary members. The device is categorized as an on-axis rotary joint when the fibers are located along the axis of rotation. The device is categorized as an off-axis rotary joint if access to the axis of rotation or centerline is not possible. The technology employed in these two types of rotary joints is quite different. The present invention concerns off-axis rotary joints.

Contactless fiber optic rotary off-axis joints have been developed as disclosed in U.S. Pat. No. 4,525,025 to the present assignee. The '025 patent discloses a fiber optic rotary joint which couples a pulsed optical signal across a rotary interface and includes an annular reflective wall formed on a stator and an optic fiber mounted on the stator having one end in close proximity and tangential to the annular reflective wall. A signal emitted by one of the optic fibers will be reflected along the annular reflective wall and received by the other of the optic fibers.

Actual joints constructed in a manner similar to that generally disclosed in the '025 patent have been limited to a rotor diameter of 10–12 inches and data rates of 50 megabits/sec. due to unacceptable propagation delays causing bit pulse-width distortion. There is a need for joints having rotor diameters of 40–50 inches using pulsed optical signals having data transfer rates of 100–400 megabits/sec. To meet these requirements, two criteria must be met. First, optical variations with rotation must be minimized. Second, propagation delays must be controlled to minimize effect on bit pulse-width distortion.

Optical variations with rotation can be minimized by using a multiplicity of optical pick-ups spaced circumferentially. The problem is that it is desirable to have as few pick-ups as possible to minimize complexity and cost.

Propagation delays must be controlled. For example, consider a waveguide that is formed into a continuous 360° arc that is four meters in circumference. If four fiber optic pick-ups located equidistant around the circumference are focused to a common photodiode and a single light source is used to inject a signal into a waveguide at a point of injection, then the optical pick-up that is nearest to the point of injection will receive the transmitted signal first and thereby transmit the received signal to the photodiode first. Because the second optical pick-up is located 90° away, the optical signal travelling from the point of injection at a speed of three ns/meter will arrive at the second pick-up three ns after the first. Similarly, the third pick-up would receive the transmitted signal after nine ns. Thus, for a four meter circumference continuous waveguide, a propagation delay of twelve ns would result. For a 100 Mb/s signal, which has a 10 ns bit width to be transmitted under these conditions, the bit shape would be distorted by signals arriving at the different optical pick-ups at different times because the propagation delays are larger than the bit width. A larger diameter joint exacerbates the problem and would exhibit even larger delays.

There is at least one arrangement currently being suggested that claims to achieve the previously mentioned circumference and data rate requirements. This suggested arrangement uses a plurality of short pieces of optical fiber arranged circumferentially in a ring shape on a stator to form an optical waveguide. A corresponding plurality of receivers or pick-ups are optically coupled to a respective short piece of fiber. A corresponding plurality of laser transmitters are circumferentially arranged on a rotor and transmit optical signals into the waveguide with each short piece of optical fiber receiving an optical signal from one of the transmitters.

This proposed arrangement has several disadvantages. Because the optical signal is being transferred in a fiber optic medium, the propagation speed of the fiber optic medium ultimately limits the effective length of the waveguide as the bit-rate increases. Thus, the length of the short pieces of fiber must be reduced as the data rate increases. This reduction in length requires more transmitters and receivers adding to cost and complexity. Additionally, the losses in the fiber optic medium requires a more powerful laser transmitter and/or a more sensitive receiver.

DISCLOSURE OF THE INVENTION

It is, therefore, an object of the present invention to provide a fiber optic rotary joint that substantially eliminates the above-mentioned problems and substantially fulfills the above-mentioned needs.

It is, therefore, an object of the present invention to provide a fiber optic rotary joint which can transmit a high bit-rate signal.

It is another object of the present invention to provide a fiber optic rotary joint capable of having a circumference of at least 4 meters.

It is yet a further object of the present invention to provide a fiber optic rotary joint which is an integrated fiber optic rotary joint assembly in which optical alignment can be performed during assembly of the fiber optic rotary joint and which does not require realignment or special modifications to the machine in which the integrated assembly is positioned.

These and other objects of the present invention are achieved by a fiber optic rotary joint including a stator having a waveguide, and a rotor rotatable through a full 360° revolution. The rotor is concentric to the stator. Light transmitters are positioned on a first circumference and connected to one of the stator and the rotor. Each of the light transmitters emits an optical signal. Light receivers are positioned on a second circumference and are connected to the other one of the stator and the rotor. The optical signals are emitted tangentially against the waveguide and reflected in short chordal lengths along the waveguide. Throughout the full 360° revolution of the rotor, each optical signal is received by less than all of the second plurality of light receivers.

According to another aspect of the invention, the number of light receivers is greater than the number of light transmitters. The optical signal is only received by light receivers that are located at a distance from the light transmitter that results in an acceptable propagation delay. Certain light receivers do not receive an optical signal during a portion of the 360° revolution of the rotor.

These and other objects of the present invention are achieved by a fiber optic rotary joint including a stator having a waveguide, and a rotor rotatable through a full 360° revolution. The rotor is concentric to the stator. A first plurality of light transmitters are positioned on the stator. Each of the first plurality of light transmitters emits an optical signal. A second plurality of light receivers is positioned on the rotor. A third plurality of light transmitters is positioned on the rotor. Each of the third plurality of light transmitters emits an optical signal. A fourth plurality of light receivers is positioned on the stator. Each of the first plurality of optical signals is emitted tangentially into the waveguide and reflected in short chordal lengths along the waveguide and each is received by less than all of the second plurality of light receivers through the full 360° revolution of the rotor. Each of the third plurality of rotor light transmitter optical signals is emitted tangentially into the waveguide and each is received by less than all of the fourth plurality of light receivers through the full 360° revolution of the rotor.

According to another aspect of the invention, the second plurality of light receivers is a greater number than the first plurality of light transmitters.

According to yet another aspect of the invention, the fourth plurality of light receivers is a greater number than the third plurality of light transmitters.

Other difficulties can be encountered when installing a fiber optic rotary joint in, for example, a cat-scan machine, as explained below.

The stator is usually the outer member and the rotor is usually the inner member. The stator and rotor usually each have multiple locations where an optical signal is either input or output in a particular location through a fiber optic cable. Each location has an optical emitter/receiver at each location.

The difficulty with such an arrangement is that the fiber optic cables extend from an optical emitter/receiver radially. Because the optical fibers extend radially, a gantry into which the fiber optic rotary joint is placed, must have openings formed therein to accommodate each optical fiber. Further, it may not be possible to allow the optical fiber to exit because of other devices being in the way.

Using the previous arrangement, the stator including a waveguide is installed in the gantry. The light emitters/receivers are then installed on the stator and rotor. Then an optical fiber is connected to each light emitter/receiver. The light emitters/receivers and optical fibers must be aligned. For example, a fiber optic rotary joint can be installed in a cat-scan machine. There are different manufacturers of the cat-scan machine and the fiber optic rotary joint. This means that the assembly and alignment of the fiber optic rotary joint must be performed at the customer's facility. This is both inconvenient and expensive.

These difficulties are overcome to a large extent and the foregoing objects of the present invention are achieved by a fiber optic rotary joint having a stator including a wave guide. A rotor is rotatable through a full 360° revolution and concentric to the stator. A first plurality of light transmitters are positioned on a first circumference and connected to one of the stator and the rotor, each of the first plurality of light transmitters emitting an optical signal. A first plurality of optical fibers are each associated with a corresponding one of the light transmitters, each optical fiber extending generally tangentially relative to the first circumference. A second plurality of light receivers are positioned on a second circumference and connected to the other one of the stator and the rotor. A second plurality of optical fibers are each associated with a corresponding one of the light receivers, each optical fiber extending generally tangentially relative to the second circumference. Each of the optical signals is emitted tangentially into the wave guide and reflected in short choral lengths along the wave guide, and each optical signal is received by less than all of the second plurality of light receivers through the full 360° revolution of the rotor.

Still other objects and advantages of the present invention will become readily apparent to those skilled in this art from the following detailed description wherein only the preferred embodiments of the invention are shown and described, simply by way of illustration of the best mode contemplated of carrying out the invention. As will be realized, the invention is capable of other and different embodiments, and several details are capable of modifications in various obvious respects, all without departing from the invention. Accordingly, the drawings and description are to be regarded as illustrative in nature, and not as restrictive.

BRIEF DESCRIPTION OF DRAWINGS

For a more complete understanding of the present invention and advantages thereof, reference is now made to the following description taken in conjunction with the accompanying drawings in which like reference numbers indicate like features and wherein:

FIG. 5 is a schematic representational view of an alternative arrangement having light transmitted at two wavelengths $\lambda_1$, and $\lambda_2$ usable in the fiber optic rotary joints of FIGS. 1 and 3;

DETAILED DESCRIPTION OF THE PREFERRED EMBODIMENTS

This application is an improvement of Ser. No. 08/942,721, filed Oct. 2, 1997, now U.S. Pat. No. 5,991,478, assigned to the instant assignee, entitled "FIBER OPTIC ROTARY JOINT", which is incorporated by reference in its entirety into this specification.

Figure 1:
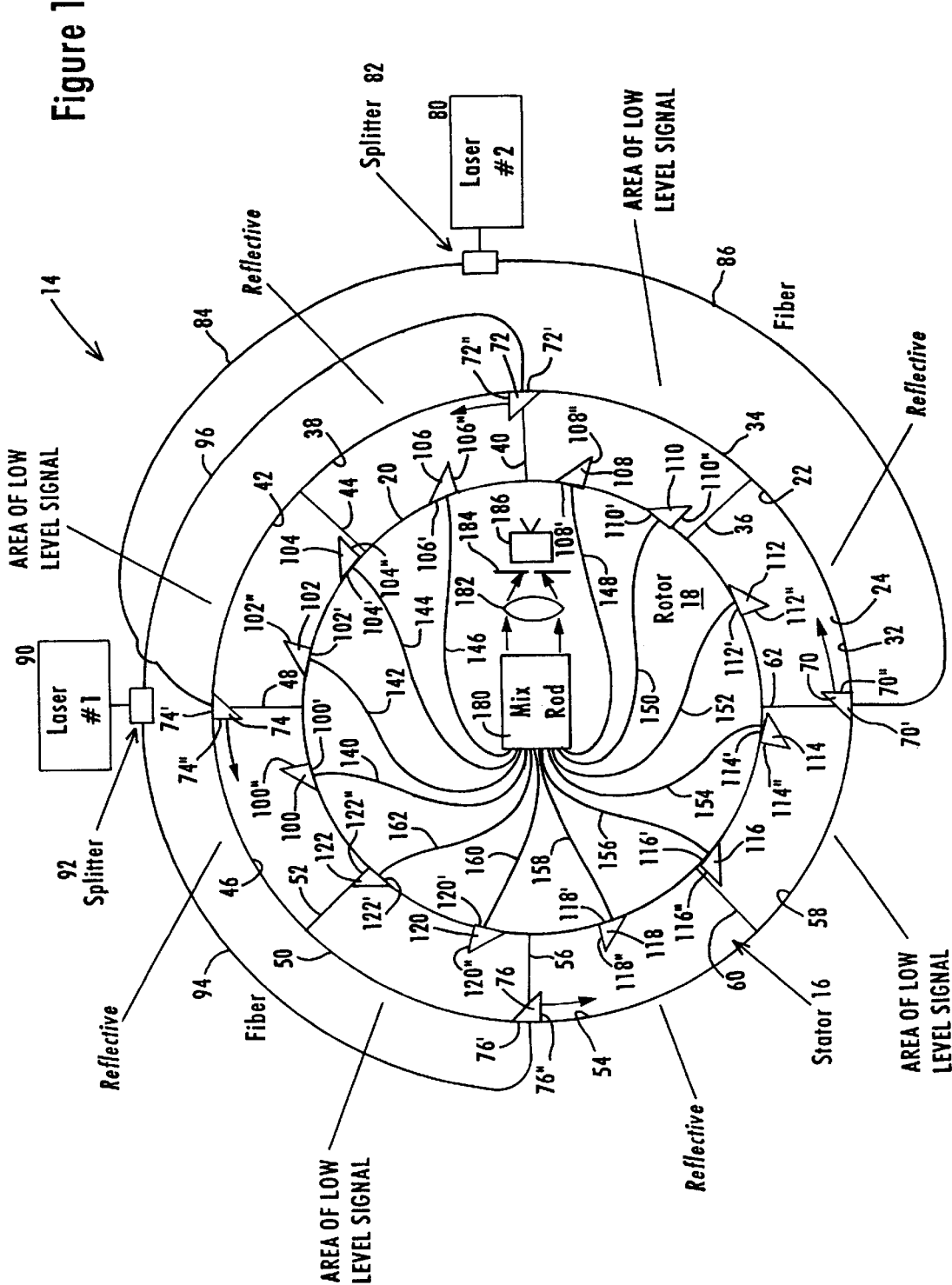
FIG. 1 is a schematic representational view of the fiber optic rotary joint according to the present invention.
Figure 2:
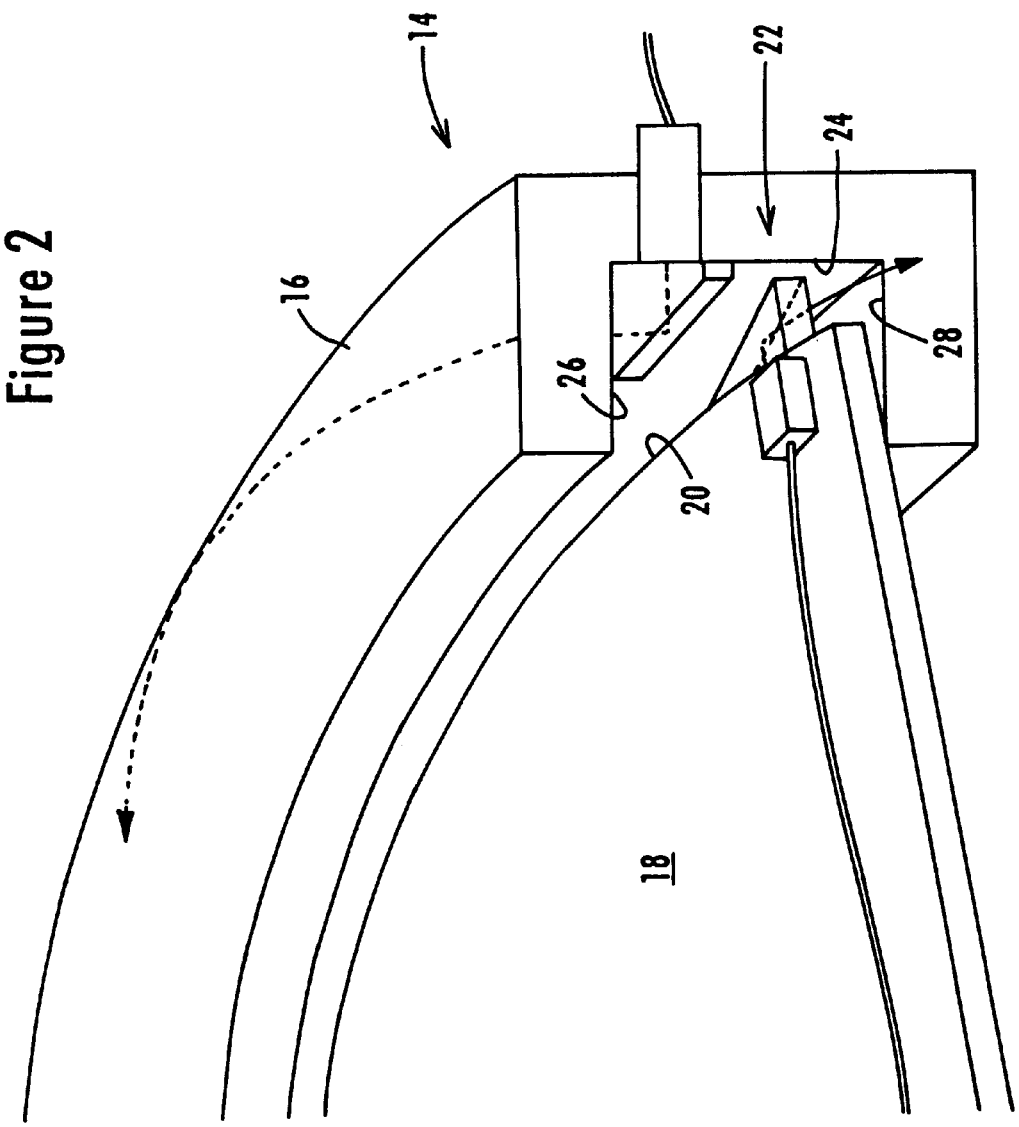
FIG. 2 is a partial perspective cross-sectional view of the fiber optic rotary joint of FIG. 1.

Refer now to FIGS. 1 and 2 where a first embodiment of a fiber optic rotary joint, generally indicated at 14, is illustrated which is constructed in accordance with the principles of the present invention. The fiber optic joint 14 is usable in any environment requiring large diameter capable of transmitting high bit-rate signals and is particularly useful for cat-scan machines. For convenience, the fiber optic rotary joint will be described in relation to the orientation illustrated in FIG. 1, and consequently, terms such as "above," "upwardly," and "clockwise," and "counterclockwise," as used herein are to be construed in the relative sense.

Fiber optic rotary joint 14 includes a stator 16 and a rotor 18. Rotor 18 has a circular outer circumference 20. Stator 16 includes a waveguide 22 having an annular inner surface 24, a top surface 26 and a bottom surface 28. Surface 24 is segmented into eight approximately equal sections or areas alternating between reflective sections 32, 38, 46, 54 and areas of low level signals 34, 42, 50, 58. Reflective sections 32, 38, 46, 54 have a polished gold reflective coating. Areas 34, 42, 50, 58 may or may not be reflective. Each section thus extends for an angular arc length of 45°. Imaginary boundaries 36, 40, 44, 48, 52, 56, 60, and 62 divide reflective and areas of low level signals 32, 34; 34, 38; 38, 42; 42, 46; 46, 50; 50, 54; 54, 58; and 58, 32; respectively.

Four light transmitters depicted as light injecting prisms 70, 72, 74, and 76 are located at 90° spaced intervals and are fixed to waveguide 30 and extend radially inwardly therefrom. Other light bending devices can be used for all of the light transmitters and receivers described with reference to FIGS. 1–6 as long as the light is bent at a ninety degree angle, such as optical fibers cut off at a forty-five degree angle or a small diameter maleable tube having optical fiber in a tube and bent at ninety degrees.

As illustrated in FIG. 1, prism 70 is at a 6 o'clock position, prism 72 is at a 3 o'clock position, prism 74 is at a 12 o'clock position and prism 76 is at a 9 o'clock position. Prism 70 has a surface 70' which straddles boundary 62 and is connected to annular reflective surface 24. A right angle light injection surface 70" is positioned in reflective segment 32 to inject light in a counter-clockwise direction as depicted in FIG. 1. Similarly, prisms 72, 74 and 76 have surfaces 72', 74' and 76' connected to annular reflective surface 24 and each straddles boundary 40, 48, 56, respectively. Right angled surface 72", 74", and 76" are positioned within reflective segments 38, 46, 54, respectively and inject light in a counter-clockwise direction, when the coupler is oriented, as depicted in FIG. 1.

A light source, such as a laser 80, emits an optical signal into a splitter 82. Optical fibers 84 and 86 are connected at one end thereof to splitter 82 and at opposite ends thereof to prisms 74, 70, respectively. A second light source, such as a laser 90, emits an optical signal into a splitter 92. Optical fibers 94, 96 have approximately equal lengths and are connected at one end thereof to splitter 92 and at opposite ends thereof to prisms 76, 72, respectively. Lasers 80, 90 are driven by the same electrical signal.

Twelve light receivers, depicted as prisms, are preferably equally circumferentially positioned on outer circumference 20 of rotor 18 and extend radially outwardly therefrom. The prisms could also be unequally spaced. Instead of prisms, other light bending devices can be used as long as the light is bent at approximately a 90° angle. Each prism 100, 102, 104, 106, 108, 110, 112, 114, 116, 118, 120, and 122 has a corresponding surface 100', 102', 104', 106', 108', 110', 112', 114', 116', 118', 120' and 122' attached to outer circumference 20. A light receiving surface 100", 102", 104", 106", 108", 110", 112", 114", 116", 118", 120" and 122" extends at right angles from outer circumference 20. Hence, as depicted in FIG. 1, each light receiving prism is positioned at 30° intervals from the next adjacent light receiving prism. Light receiving faces 100", 102", 104", 106", 108", 110", 112", 114", 116", 118", 120" and 122" face in a clockwise direction as depicted in FIG. 1. Light injecting faces 70", 72", 74" and 76" face in a counterclockwise direction as depicted in FIG. 1. The orientation of these faces can be reversed so long as the light injecting surfaces face in an opposite direction from the light receiving surfaces. Preferably, the angular arc length between the light receiving prisms 100–122 is less than the angular arc length of reflective sections 32, 38, 46, 54.

Fiber optic cables 140, 142, 144, 146, 148, 150, 152, 154, 156, 158, 160, 162, are connected at one end thereof to light receiving prisms 100, 102, 104, 106, 108, 110, 112, 114, 116, 118, 120, 122, respectively and at opposite ends thereof to a signal combiner or mix rod 180. Each fiber optic cable 140–162 should be of approximately equal length to avoid propagation delays so that signals received at mix rod 180 are received nearly simultaneously. In this manner, the mix rod 180 combines light from all of the fiber optic cables into one optical signal. Mix rod 180 emits the optical signal, which then is focused by a lens 182 through an optional member having a round or straight slit 184, onto a photodiode 186. Photodiode 186 converts in a known manner the optical signal into an electrical signal.

Annular surface 24, top surface 26 and bottom surface 28 of waveguide 22 form a U-shape as depicted in FIG. 2. The edge of rotor 18 is positioned between surfaces 26 and 28 and radially inwardly from surface 24. Preferably the light receiving prisms are vertically spaced from the light injecting prisms but overlap radially as depicted in FIG. 2. The light receiving prisms are located on one plane and vertically spaced light transmitting prisms are located on another plane vertically spaced from the first plane.

In operation, the rotor 18 can rotate in either a clockwise or a counter-clockwise direction as depicted in FIG. 1. Lasers 80 and 90 each nearly simultaneously transmit an optical signal containing identical information into splitters 82, 92. Splitters 82, 92 divide each signal into two optical signals and inject those signals into optical fibers 84, 86 and 94, 96, respectively. Fibers 84, 86 and 94, 96 are of approximately equal lengths to avoid propagation delays. Each signal is then launched by a respective prism 70, 72, 74, 76 into a respective reflective section 32, 38, 46, 54 of waveguide 22. Each signal emitted by a respective prism 70, 72, 74, 76 is emitted nearly simultaneously and contains identical information. The amount of power for a given signal is determined, in part, by the desired data rate. Using multiple light sources around the circumference of the rotor 18 or stator 16 allows the transmitted signal to be picked up in multiple locations. The signals are summed at the combiner 180 to provide a signal such that the required bit error rate can be met. For example, it is known from communication theory that an optical receiver that is capable of receiving a bit stream at a data rate of 125 Mb/s must receive a minimum of $8 \times 10^{-7}$ watts to meet a $1 \times 10^{-9}$ bit error rate. Although the light transmitters 70, 72, 74, 76 are shown in the figure at 90° intervals, it is known that a more uniform signal will be received as the rotor 18 moves with respect to the stator 16 if the light transmitters are not located precisely at 90° intervals. For example, one set of conditions may have the light transmitters arranged at 0°, 82.5°, 165° and 247.5°. The number and location of sources can be varied to meet the data rate requirements.

The four optical signals emitted from faces 70", 72", 74", 76" impinge on and are deflected by the reflective sections 32, 38, 46, 54, respectively, and propagate along each surface in short chordal paths until being intercepted and received by, as depicted in FIG. 1, light receiving prisms 112, 106, 100, 118, respectively. Prisms located adjacent to areas of low level signals do not receive any optical signals. For example, as depicted in FIG. 1, prisms 110, 108, 104, 102, 122, 120, 116, 114 do not receive optical signals.

Referring specifically to prism 70 and prisms 112, 110, 108, as depicted in FIG. 1, only prism 112 will receive a usable signal due to the signal emitted from prism 70 becoming attenuated or dissipated. For example, using a 40 milliwatt laser, prism 112 should receive an optical signal equivalent to an electrical signal of 19 mV while positioned thirty degrees away prisms 110 should receive an optical signal equivalent to an electrical signal of 3 mV and prism 108 should receive an optical signal equivalent to an electrical signal of 0.5 mV. The intensity of the optical signal is usable in reflective section 22 but becomes too low by the time the optical signal reaches area 34. The optical signal received in area 34 is low enough that it would not be detected. If the optical signal were detected, it would cause bit width distortion due to propagation delay. Part of the reason the signal is not detected is because of noise levels which are approximately 1–2 mV for an amplifier capable of producing 100–400 megabit/sec. signals as used in the present invention. If these prisms 110, 108, 104, 102, 122, 120, 116, 114 received an optical signal, then bit distortion would result because of the propagation delay.

Each optical signal is then transmitted through fibers 152, 146, 140, 158, respectively, to signal summer 180 where the four signals are combined and summed. Advantageously, this arrangement solves optical amplitude variations by permitting signals to be transferred at all rotational positions of rotor 18 and allows the signals to be summed from multiple locations to ensure that a strong signal is received at all rotational positions of rotor 18. For example, in reference to FIG. 1, each of the reflective portions of the waveguide extends at a 45° angle. By contrast, the prisms are spaced at a 30° angle. Thus, during the rotation of rotor 18, at least one, and at times, two prisms will be located within a given reflective section.

Advantageously, the present invention also overcomes to a large extent propagation delays by injecting the optical signal at four locations 90° apart. The waveguide length and/or the length that the receiver is located from the transmitter in each 90° quadrant is restricted to a length that permits acceptable bit distortion. Thus, as bit-rate increases, the length of waveguide used in each 90° quadrant must decrease and/or additional transmitters must be used. In the present invention, more receivers are used than transmitters and certain receivers are prevented from receiving an optical signal during a portion of the 360° revolution of the rotor. Ultimately, the bit-rate can increase until it is not possible to have an acceptable length of waveguide such that a uniform signal can be picked up at all angles. In this event, it may be desirable to provide additional light injecting prisms on the stator and additional light receiving prisms around the rotor to shorten the path length around the reflective annular surface between the light injecting prism and the light receiving prism.

An advantage of allowing the signal to be propagated in air rather than a medium such as glass or plastic is that the propagation speeds are faster in air. (Propagation speed for air is approximately 3 ns/meter; propagation speed for glass having a refractive index equal to 1.41 is approximately 5 ns/meter). Propagation speed ultimately determines the effective length of waveguide that can be used as bit-rate increases. Thus, more length of waveguide will be available for the transfer signal when the signal is propagating in air rather than a glass or fiber.

Figure 3:
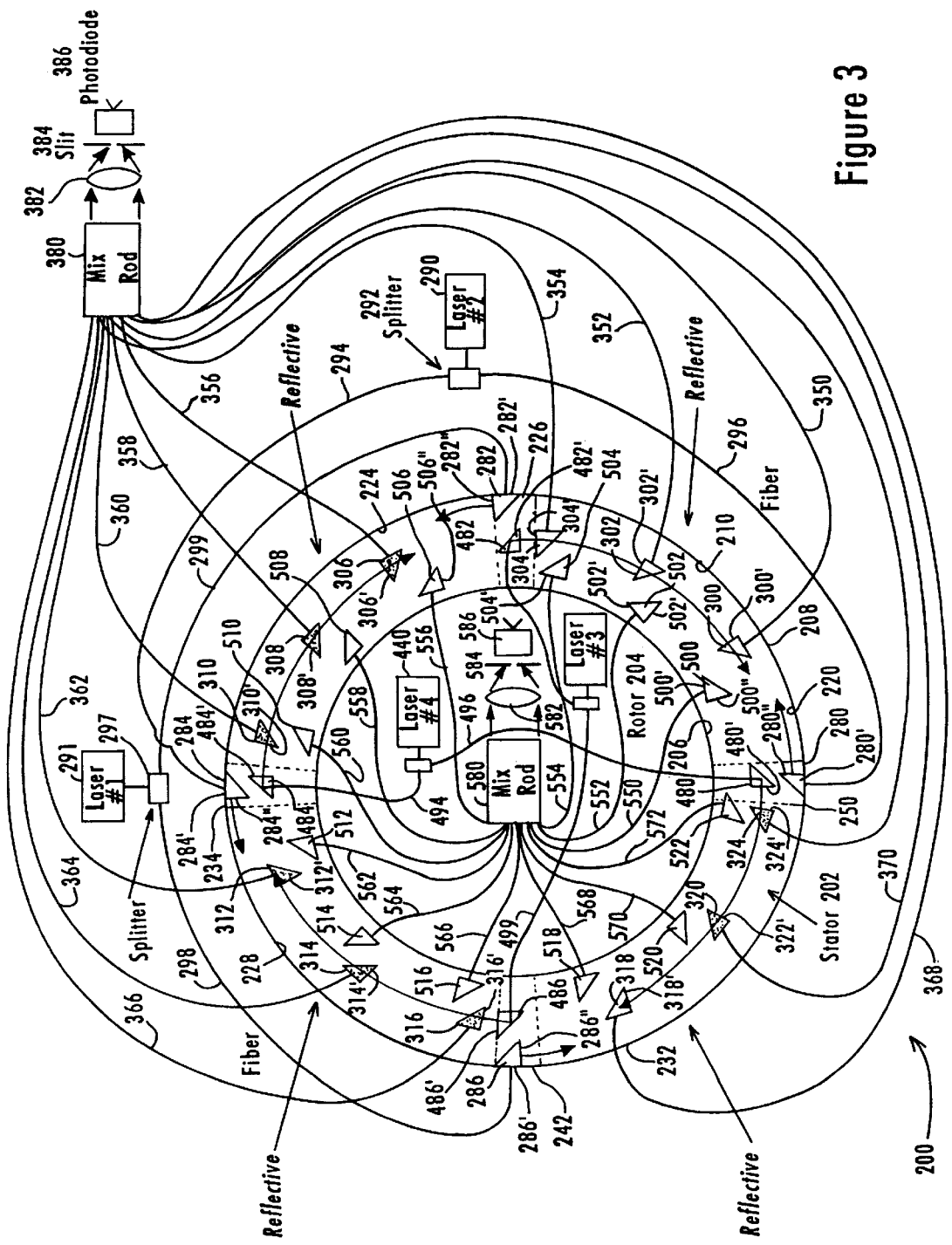
FIG. 3 is a schematic representational view of a second embodiment fiber optic rotary joint according to the present invention.

A second embodiment of the present invention is depicted in FIG. 3 where a fiber optic rotary joint, generally indicated at 200, is illustrated, which is constructed in accordance with the principles of the present invention.

In many applications, it is required to transmit data from the rotating member to the stationary member and control signals from the stationary member to the rotating member. Other applications may require the opposite scenario. In any case, bi-directional capability is required. Advantageously, the present invention provides the capability to transmit bidirectional signals on the same waveguide. This feature is extremely important in relation to packaging and the amount of space required for the large diameter fiber optic rotary joint.

Two optical signals can be transmitted by the same waveguide, but must travel in opposite directions in the waveguide. Thus, a signal originating on a rotor and a frame can be injected in opposite directions and, because their pick-up assemblies have directionality, two signals will not mix or cross talk to each other.

Fiber optic rotary joint 200 (FIG. 3) is a bidirectional joint having duplex operation in which signals can be transferred from the rotating rotor to the stator or can be transferred from the stator to the rotating rotor, or both.

Fiber optic rotary joint 200 includes a stator 202 and a rotor 204. Rotor 204 has a circular outer circumference 206. Stator 204 includes a waveguide 208 having an annular reflective surface 210 and a top surface (not shown) and a bottom surface (not shown). Surface 210 is segmented into 18 alternating sections or areas, alternating between reflective sections 220, 224, 228, 232, and areas of low level signals 226, 234, 242, 250, respectively.

Four light transmitters depicted as light injecting prisms 280, 282, 284, 286, are located at 90° spaced apart intervals and are fixed to waveguide 208 and extend radially inwardly therefrom. Instead of prisms, other light bending devices can be used as long as the light is bent at a 90° angle. As illustrated in FIG. 3, prism 280 is at a 6 o'clock position, prism 282 is at a 3 o'clock position, prism 286 is at a 12 o'clock position, and prism 286 is at a 9 o'clock position. Prisms 280, 282, 284 and 286 have surfaces 280', 282', 284', and 286' attached to annular surface 210. Right angle surfaces 280", 282", 284", 286", are located in non-reflective segments 250, 226, 234, and 242, respectively. Right angle faces 280", 282", 284" and 286" face in a counterclockwise direction as depicted in FIG. 1.

A light source, such as a laser 290, emits an optical signal into a splitter 292. Optical fibers 294, 296 are connected at one end thereof to splitter 292 and at opposite ends thereof to prisms 284, 280, respectively. A second light source, such as a laser 291, emits an optical signal into a splitter 297. Optical fibers 298, 299 are connected at one end thereof to splitter 297 and at opposite ends thereof to prisms 286, 282, respectively.

Twelve light receivers, depicted as prisms, are equally circumferentially fixedly positioned on stator 202 between waveguide 208 and rotor 204. Instead of prisms, other light bending devices can be used as long as the light is bent at a 90° angle. Each prism has a light receiving face 300', 302', 304', 306', 308', 310', 312', 314', 316', 318' 320' and 322' extending at right angles relative to annular surface 210 and facing in a counterclockwise direction as depicted in FIG. 3. Fiber optic cables 350, 352, 354, 356, 358, 360, 362, 364, 366, 368, 370 and 372 are connected at one end thereof to light receiving prisms 300, 302, 304, 306, 308, 310, 312, 314, 316, 318, 320 and 322, respectively, and at opposite ends thereof to a signal combiner or mix rod 380. Each fiber optic cable 350–372, should be of approximately equal length to avoid propagation delays. Mix rod 380 emits a signal focused by a lens 382 through an optional member having a straight or round slit 384 into a photodiode 386. Photodiode 386 converts the optical signal into an electrical signal in a known manner.

Four light transmitters depicted as light injecting prisms 480, 482, 484 and 486 are fixed to rotor 204 and extend radially outwardly therefrom. As illustrated in FIG. 3, prism 480 is at a 6 o'clock position, prism 482 is at a 3 o'clock position, prism 484 is at a 12 o'clock position, and prism 486 is at a 9 o'clock position. Prisms 480, 482, 484 and 486 have light injecting surfaces 480', 482', 484' and 486' to inject light in a clockwise direction as depicted in FIG. 3.

A light source, such as laser 490, emits an optical signal into splitter 492. Optical fibers 484, 486 are connected at one end thereof to splitter 492 and at opposite ends thereof to prisms 484, 480, respectively. A second light source, such as a laser 491, emits an optical signal into a splitter 497. Optical fibers 498, 499 are connected at one end thereof to splitter 497 and at opposite ends thereof to prisms 482, 486, respectively.

Twelve light receivers, depicted as prisms, are equally circumferentially positioned on outer circumference 206 of rotor 204 and extend radially outwardly therefrom. Instead of prisms, other light bending devices can be used as long as the light is bent at a 90° angle. Each prism 500, 502, 504, 506, 508, 510, 512, 514, 516, 518, 520, and 522 has a corresponding surface 500', 502', 504', 506', 508', 510', 512', 514', 516', 518', 520' and 522' attached to outer circumference 206. A light receiving surface 500", 502", 504", 506", 508", 510", 512", 514", 516", 518", 520" and 522" extends at right angles from outer circumference 206. Hence, as depicted in FIG. 3, each light receiving prism is positioned at 30° intervals from the next adjacent light receiving prism. Light receiving faces 500", 502", 504", 506", 508", 510", 512", 514", 516", 518", 520" and 522" face in a clockwise direction as depicted in FIG. 4. The orientation of these faces can be reversed so long as the light injecting surfaces face in an opposite direction from the light receiving surfaces.

Fiber optic cables 550, 552, 554, 556, 558, 560, 562, 564, 566, 568, 570, 572, are connected at one end thereof to light receiving prisms 500, 502, 504, 506, 508, 510, 512, 514, 516, 518, 520, 522, respectively and at opposite ends thereof to a signal combiner or mix rod 180. Each fiber optic cable 550–572 should be of approximately equal length to avoid propagation delays so that signals received at mix rod 580 are received nearly simultaneously. Mix rod 580 emits a signal focused by a lens 582 through an optional member having a straight or round slit 584 into a photodiode 586. Photodiode 586 converts in a known manner the optical signal into an electrical signal.

In operation, rotor 204 can rotate in either a clockwise or counter-clockwise direction as depicted in FIG. 3. Lasers 290 and 291 each nearly simultaneously transmit an optical signal containing identical information into splitters 292, 297. Splitters 290, 291 divide each signal into optical fibers 294 and 296, 298 and 299, respectively. Each signal is then launched by a respective prism 284, 280, 286, 282 into a respective reflective section 236, 220, 244, 228 of waveguide 208 in a counterclockwise direction and propagates along each surface in short chordal paths until being intercepted and received by, as depicted in FIG. 3, light receiving prisms 500, 506, 512, 518. Each signal emitted by a respective prism 284, 280, 286, 282 is emitted nearly simultaneously and contains identical information. Similarly, lasers 490 and 491 each nearly simultaneously transmit an optical signal containing identical information into splitters 492, 497. Splitters 490, 491 divide each signal into optical fibers 494, 496 and 498, 499, respectively. Each signal is then launched by a respective prism 484, 480, 486, 482 into a respective reflective section 232, 238, 240, 224 of wave guide 208 in a clockwise direction and propagate along each surface in short choral paths until being intercepted and received by, as depicted in FIG. 3, light receiving prisms 310, 304, 324, 316. Each prism can only receive an optical signal through its light receiving surface.

Certain prisms do not receive any optical signals at a given rotational position. For example, as depicted in FIG. 3, prisms 502, 504, 508, 510, 514, 516, 520, 522 and 300, 302, 306, 308, 312, 314, 318, 320 do not receive optical signals. If these prisms received an optical signal, then bit distortion would result because of the propagation delay.

Each optical signal is then transmitted through fibers 354, 360, 366, 372 and 550, 556, 562, 568 respectively, to signal summers 380, 580 where the four signals are combined and summed. Advantageously, this arrangement solves optical amplitude variations by permitting signals to be transferred at all rotational positions of rotor 18 and allows the signals to be summed from multiple locations to ensure that a strong signal is received at all rotational positions of rotor 204.

Figure 4B:
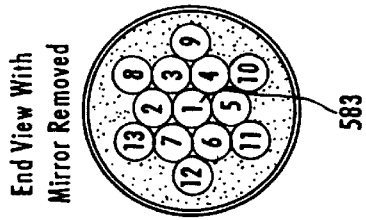
FIG. 4B is a side elevational view of a star coupler in FIG. 4A.
Figure 4A:
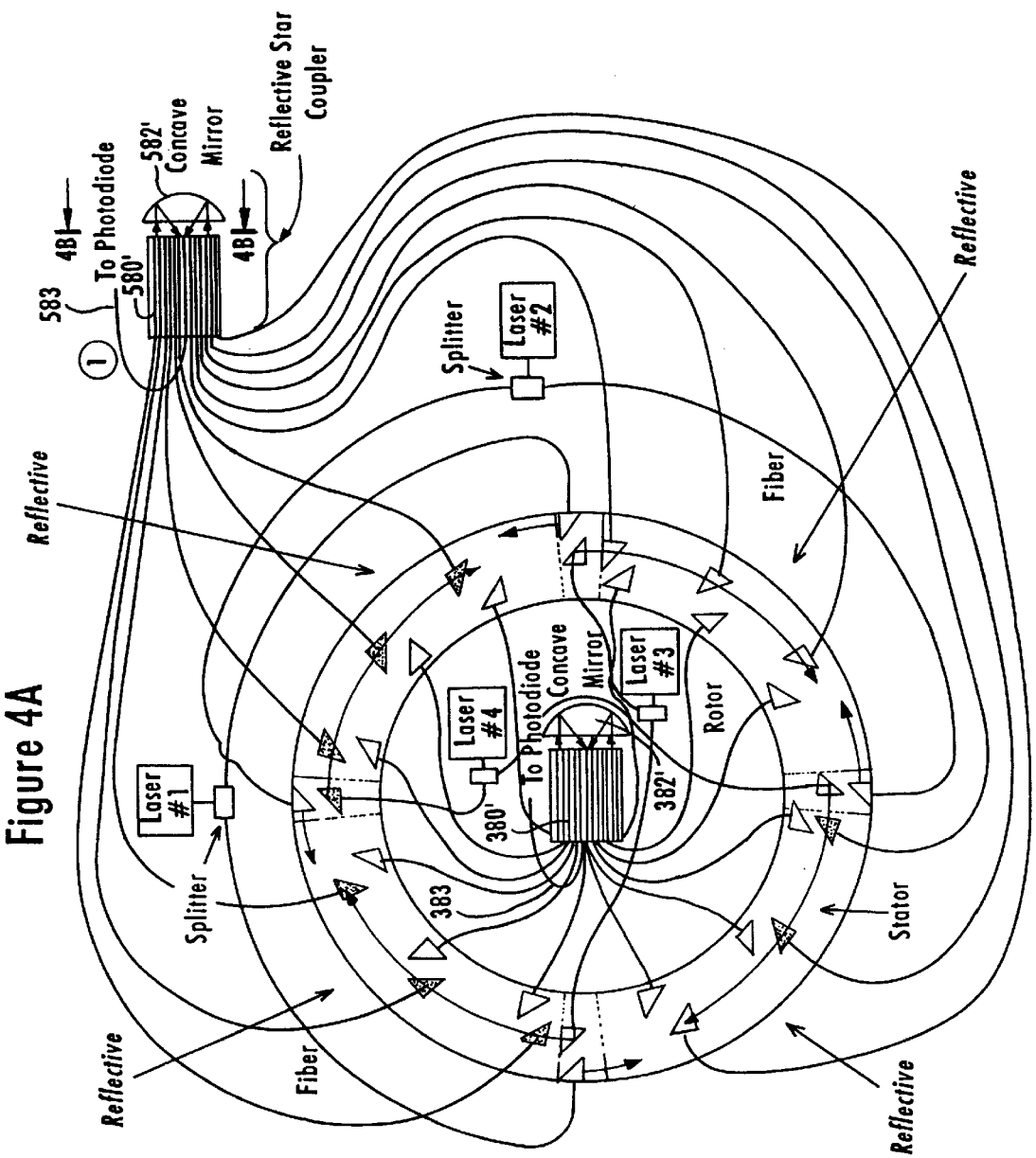
FIG. 4A is a schematic representational view of an alternative signal combiner for the fiber optic rotary joints of FIGS. 1 and 3.

In FIG. 4A, an alternative arrangement for signal combiner 380 is illustrated. For clarity, only reference numbers which are different from the embodiment depicted in FIG. 3 are numbered. Instead of using mix rods 380 and 580, star couplers 380' and 580' are used. The optical signals transmitted to star coupler 380' from fiber optic cables 350–372 are emitted into a concave mirror 382' and focused and reflected into a centrally located fiber optic cable 383 (FIG. 4B). This combined signal is then transferred to a photodiode (not shown) and converted to an electrical signal in a known manner. The star coupler 580' functions in the same manner as star coupler 380'.

In FIG. 5, a third embodiment of the present invention is illustrated. In this third embodiment, a star coupler is depicted although a mix rod can also be used. For clarity, only reference numbers which are different from the embodiments depicted in FIGS. 3 and 4 are numbered. Also for clarity, only additional light sources are depicted and explained for transmitting an optical signal from the stator to the rotor. It should be understood that additional light sources could be added to transmit light signals from the rotor to the stator. It should be further understood that there can be two channels in both directions.

In the fiber optic communication system of the present invention wave division multiplexing can add additional optical signals to a fiber optic data link. This technique utilizes light sources of differing wavelengths to transmit signals. For example, if two electrical signals need to be transmitted on a single fiber, then it is possible to do so by using light sources of $\lambda_1$ and $\lambda_2$. These two different wavelengths can be transmitted through the fiber and, prior to detection, can be separated with optical filters.

Also in FIG. 5, there are two light sources 610, 612 instead of single light source 80. Light sources 610, 612 inject optical signals at wavelengths $\lambda_1$, $\lambda_2$ into splitter 82. Similarly, instead of light source 90, there are two light sources 620, 622 which inject optical signals at wavelengths $\lambda_1$, $\lambda_2$ into splitter 92. In the illustrated embodiment, $\lambda_1$, $\lambda_2$ from light sources 610, 612 is at the wavelength as $\lambda_1$, $\lambda_2$ emitted from light sources 620, 622. It should be understood $\lambda_1$, $\lambda_2$ emitted from light sources 610, 612 can be at different wavelengths compared to $\lambda_1$, $\lambda_2$ emitted from light sources 620, 622.

After optical signals $\lambda_1$, $\lambda_2$ have been combined by star coupler 380', these optical signals are then transferred by optical fiber 383 to a dichroic filter 650 which separates the two optical signals into two different optical fibers 652, 654.

Figure 6:
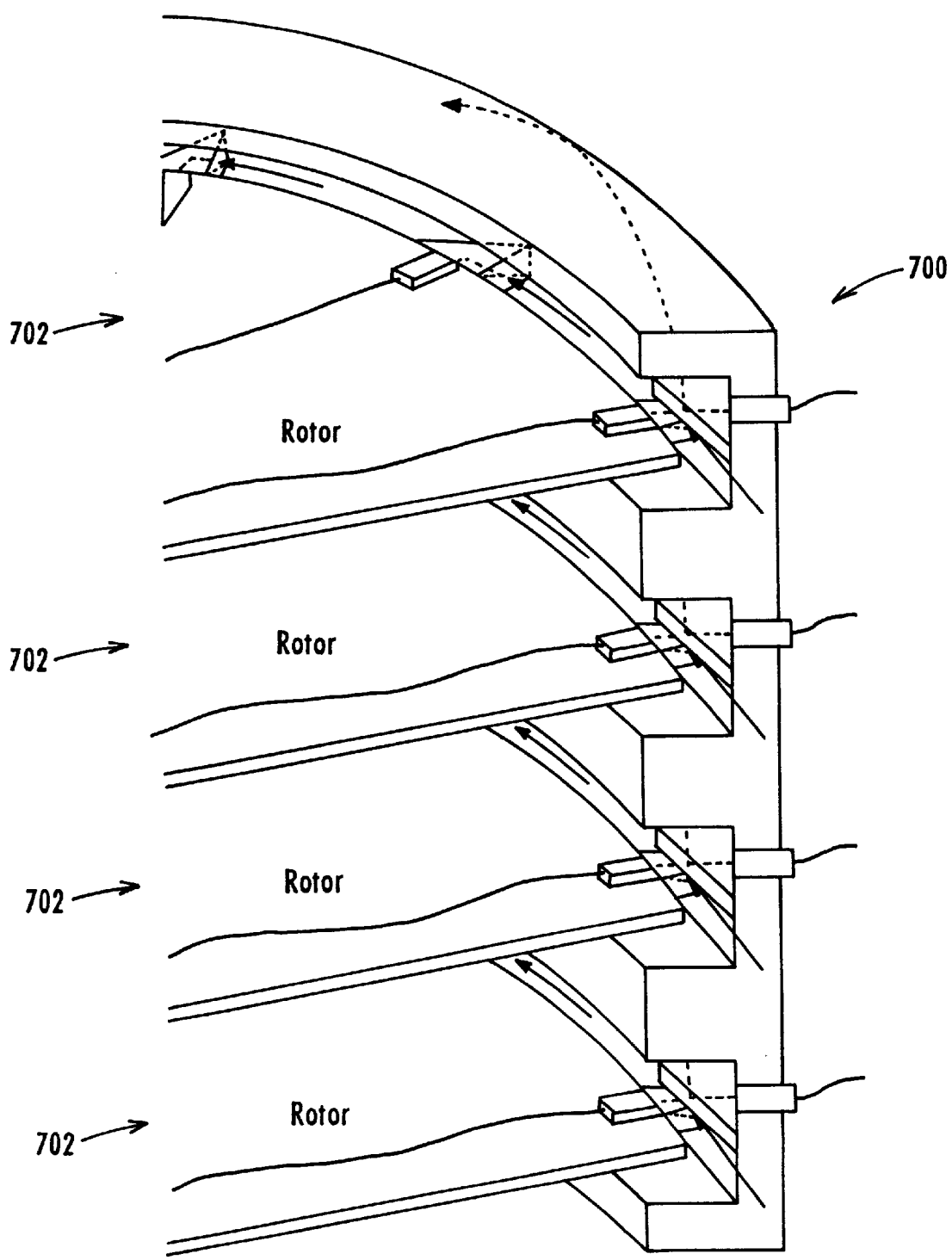
FIG. 6 is a partial perspective cross-sectional view depicting an array of fiber optic rotary joints having multi-channel capability.

In FIG. 6, a construction is illustrated in which a plurality of fiber optic rotary joints 700 may be aligned along a common axis to form a stack 702 to provide a plurality of channels. Rotary joints 600 may be either unidirectional rotary joints or bidirectional rotary joints as previously described.

Figure 7:
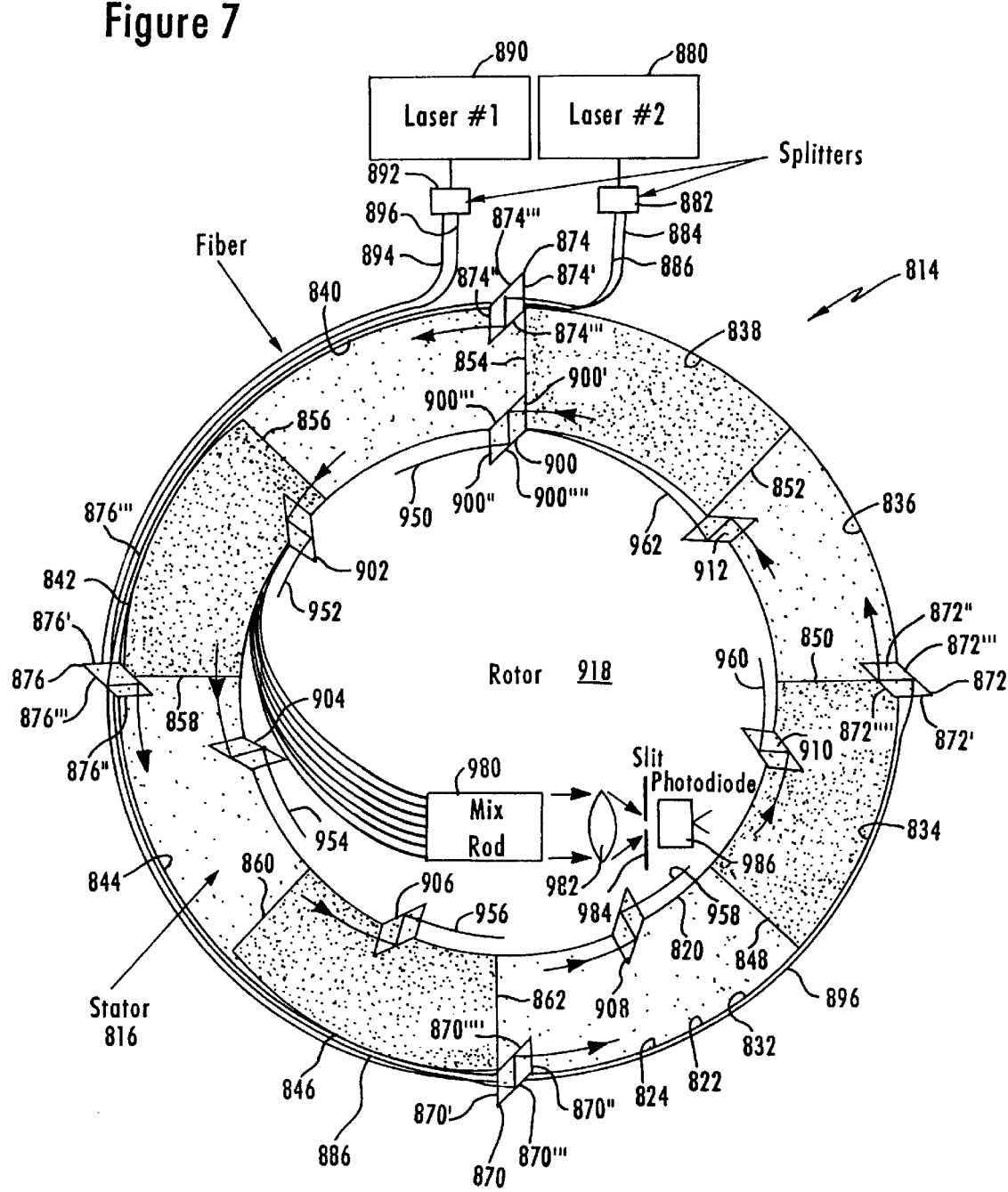
FIG. 7 is a schematic representational view of a third embodiment of a fiber optic rotary joint according to the present invention.

Refer now to FIG. 7 where a third embodiment of a fiber optic rotary joint, generally indicated at 814, is illustrated which is constructed in accordance with the principles of the present invention. The fiber optic joint 814 is usable in any environment requiring large diameter capable of transmitting high bit-rate signals and is particularly useful for cat-scan machines.

Fiber optic rotary joint 814 includes a stator 816 and a rotor 818. Rotor 818 has a circular outer circumference 820. Stator 816 includes a waveguide 822 having an annular inner surface 824, a top surface 826 and a bottom surface 828 (see FIG. 2 for surfaces 26 and 28). Surface 824 is segmented into eight approximately equal sections or areas alternating between reflective sections 832, 836, 840, 844 and areas of low level signals 834, 838, 842, 846. Reflective sections 832, 836, 840, 844 have a polished gold reflective coating. Areas 834, 838, 842, 846 may or may not be reflective. Each section thus extends for an angular arc length of 45°. Imaginary boundaries 848, 850, 852, 854, 836, 858, 860 and 862 divide reflective and areas of low level signals 832, 834; 834; 836; 836, 838; 838, 840; 840, 842; 840, 844; 844, 846; and 858, 824; respectively.

Four light transmitters depicted as light injecting parallelograms 870, 872, 847, and 876 are located at 90° spaced intervals and are fixed to waveguide 822 and extend radially inwardly and outwardly therefrom. Although parallelograms are presently preferred, other light bending devices can be used for all of the light transmitters and receivers described herein as long as the light is injected or received tangentially relative to the wave guide. Although the parallelogram is depicted as a one-piece optical element, the parallelogram can be made, for example, from two prisms cemented together.

As illustrated in FIG. 7, parallelogram 870 is at a 6 o'clock position, parallelogram 872 is at a 3 o'clock position, parallogram 874 is at a 12 o'clock position and parallelogram 876 is at a 9 o'clock position. Each parallelogram has four surfaces. For example, parallelogram 870 has surfaces 870', 870", 870'", 870"". Surfaces 870' and 870" are parallel to each other. Surface 870' extends radially outwardly from the wave guide 822. Surfaces 870'" and 870"" are parallel to each other. Surface 870' extends radially outwardly from the wave guide 822. Surface 870" extends radially inwardly from the waveguide 822 and is positioned in reflective segment 832 to inject light in a counterclockwise direction. Surface 870'" connects surfaces 870' and 870" and extends, at an angle, radially outwardly from the waveguide 822. Surface 870"" connects surfaces 870' and 870" and extends, at an angle, radially inwardly from the waveguide 822. Parallelograms 872, 874, 876 have similarly numbered surfaces depicted in FIG. 7 but for the sake of brevity are not discussed herein.

A light source, such as a laser 880, emits an optical signal into a splitter 882. Optical fibers 884 and 886 are connected at one end thereof to splitter 882 and at opposite ends thereof to parallelograms 874, 870, respectively. A second light source, such as a laser 890, emits an optical signal into a splitter 892. Optical fibers 894, 896 have approximately equal lengths and are connected at one end thereof to splitter 892 and at opposite ends thereof to prisms 876, 872, respectively. Lasers 880, 890 are driven by the same electrical signal.

Seven light receivers, depicted as parallelograms, as preferably equally circumferentially positioned on outer circumference 820 of rotor 818. The parallelograms could also be unequally spaced. Although parallelograms are presently preferred, instead of parallelograms, other light bending devices can be used as long as the light is bent twice at approximately 90° angle. Each parallelogram 900, 902, 904, 906, 908, 910, 912 has four surfaces. For example, parallelograms 900 has surfaces 900', 900", 900'", 900"". Hence, as depicted in FIG. 1, each light receiving parallelogram is positioned at approximately 51° intervals from the next adjacent light receiving parallelogram. Although seven light receiving parallelograms are depicted in FIG. 7, the invention is not so limited. The number of parallelograms is determined by the diameter of the joint, the optical power budget that is to be achieved, and the degree of redundancy (i.e., the number of parallelograms that can potentially fail and the joint can still be funcional). Light receiving faces 900', 902', 904', 906', 908', 910', 912', face in a clockwise direction as depicted in FIG. 7. Light injecting faces 870', 872', 874' and 876' face in a counterclockwise direction as depicted in FIG. 7. The orientation of these faces can be reversed so long as the light injecting surfaces face in an opposite direction from the light receiving surfaces. Preferably, the angular arc length between the light receiving parallelograms 900–912 is less than the angular arc length of reflective sections 832, 836, 840, 844.

Fiber optic cables 950, 952, 954, 956, 958, 960, 962 are connected at one end thereof to light receiving parallelograms 900–912, respectively and at opposite ends thereof to a signal combiner or mix rod 980. Each optical fiber 950–962 extends generally tangentially within the outer diameter 820 of rotor 818 and conforms thereto. Each fiber optic cable 950–962 should be of approximately equal length to avoid propagation delays so that signals received at mix rod 980 are received nearly simultaneously. In this manner, the mix rod 980 combines light from all of the fiber optic cables into one optical signal. Mix rod combines light from all of the fiber optic cables into one optical signal. Mix rod 980 emits the optical signal, which then is focused by a lens 982 through an optional member having a round or straight slit 984, onto a photodiode 986. Photodiode 986 converts in a known manner the optical signal into an electrical signal.

The rotor 818 and the stator 816 are positioned between surfaces 26 and 28 as illustrated in FIG. 2 and previously discussed.

In operation, the rotor 818 can rotate in either a clockwise or a counterclockwise direction as depicted in FIG. 7. Lasers 880 and 890 each nearly simultaneously transmit an optical signal containing identical information into splitters 882 and 892. Splitters 882 and 892 divide each signal into two optical signals and inject those signals into optical fibers 884, 886 and 894, 896, respectively. Fibers 884, 886 and 894, 896 are of approximately equal lengths to avoid propagation delays. Each fiber 884, 886, 894, 896 extends generally tangentially to the outer diameter of the stator 816 and generally conforms thereto. Each signal is then launched by a respective parallelogram 870, 872, 874, 876 into a respective reflective section 832, 836, 840, 844 of waveguide 822. Each signal emitted by a respective parallelogram 870, 872, 874, 876 is emitted nearly simultaneously and contains identical information. The amount of power for a given signal is determined, in part, by the desired data rate. Using multiple light sources around the circumference of the rotor 818 or stator 816 allows the transmitted signal to be picked up in multiple locations. The signals are summed at the combiner 980 to provide a signal such that the required bit error can be met. For example, it is known from communication theory that an optical receiver that is capable of receiving a bit stream at a data rae of 125 Mb/s must receive a minimum of $8 \times 10^{-7}$ watts to meet a $1 \times 10^{-9}$ bit error rate. Although the light transmitters 870, 872, 874, 876 are shown in the figure at 90° intervals, it is known that a more uniform signal will be received as the rotor 818 moves with respect to the stator 816 if the light transmitters are not located precisely at 90° intervals. For example, one set of conditions may have the light transmitters arranged at 0°, 82.5, 165°, and 247.5°. The number and location of sources can be varied to meet the data rate requirements.

An optical signal is injected, for example, into parallelogram 876 through optical fiber 894 into surface 876'. The signal is then reflected off of angled surface 876''' onto angled surface 876'''' and then is injected through surface 876''.

The four optical signals emitted from faces 870'', 872'', 874'', 876'' impinge on and are reflected by the reflective sections 832, 836, 840, 844, respectively, and propagate along each surface in short chordal paths until being intercepted and received by, as depicted in FIG. 7, light receiving parallelogram 908, 912, 904, respectively. Parallelograms located adjacent to areas of low level signals do not receive any optical signals. For example, as depicted in FIG. 7, prisms 910, 900, 902, 906 do not receive optical signals.

Each optical signal is then transmitted through fibers 958, 962, 954, respectively, to the signal summer 980 where the four signals are combined and summed.

The embodiment illustrated in FIG. 7 can also be modified to function bi-directionally as discussed above with respect to FIGS. 3 and 4. The mix rod 980 can also be replaced with a star coupler as discussed above with respect to FIGS. 4A and 4B. There can also be two lasers coupled to each parallelogram as discussed above with respect to FIG. 5. There can also be multiple wave guides as discussed above with respect to FIG. 6. Advantageously, the embodiment of FIG. 7, can be fabricated, aligned and tested and shipped as an integrated assembly and installed easily into, for example, a cat-scan machine. The use of a parallelogram permits the optical fibers that transmit optical signals into and from the parallelograms to extend generally tangentially to the outer diameters of the rotor and the stator. The cat-scan gantry does need to be modified as all optical fibers can be routed through a single opening in the gantry. The optical fibers can conform to the outside diameter of stator and the outer diameter of the rotor. These optical fibers can enter and exit through openings in the gantry used for other electrical cables. The cat-scan manufacturer does not have to identify multiple locations for the optical fibers to enter and exit. The rotor and stator can be installed in the gantry and the optical fibers routed through the electrical cable openings and the installation is essentially complete. Unlike the embodiments of FIGS. 1–6 in which the optical fibers extend radially, requiring separate and special openings in the gantry, the generally tangentially extending optical fibers simplify the construction and installation of the fiber optic rotary joint.

It will be readily seen by one of ordinary skill in the art that the present invention fulfills all the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A fiber optic rotary joint comprising:
   a stator including a waveguide;
   a rotor rotatable through a full 360° revolution and concentric to said stator;
   a first plurality of light transmitters positioned on a first circumference and connected to one of said stator and said rotor, each of said first plurality of light transmitters emitting an optical signal;
   a first plurality of optical fibers each associated with a corresponding one of said light transmitters, each optical fiber extending generally tangentially relative to said first circumference;
   a second plurality of light receivers positioned on a second circumference and connected to the other one of said stator and said rotor,
   a second plurality of optical fibers each associated with a corresponding one of said light receivers, each optical fiber extending generally tangentially relative to said second circumference;
   wherein each of the optical signals is emitted tangentially into said waveguide and reflected in short chordal lengths along said waveguide, and each optical signal is received by less than all of said second plurality of light receivers through said full 360° revolution of said rotor.

2. The fiber optic rotary joint of claim 1, wherein said second plurality of light receivers is a larger number than said first plurality of light transmitters.

3. The fiber optic rotary joint of claim 1, wherein said plurality of light transmitters are unequally circumferentially spaced.

4. The fiber optic rotary joint of claim 1, wherein said light transmitters and said light receivers comprise parallelograms.

5. The fiber optic rotary joint of claim 4, wherein each of said parallelograms extends radially inwardly and outwardly from one of said stator and said rotor.

6. The fiber optic rotary joint of claim 1, further comprising a third plurality of optical fibers each coupled at one end thereof to a corresponding one of said light receivers and at an opposite end thereof to a signal combiner.

7. The fiber optic rotary joint of claim 6, further comprising a lens, a slit and a photodiode, said lens for receiving an optical signal from said signal combiner and focusing said optical signal into and through said slit for reception by said photodiode.

8. The fiber optic rotary joint of claim 6, wherein each of said third plurality of optical fibers has approximately the same length.

9. The fiber optic rotary joint of claim 1, wherein said waveguide is segmented into reflective portions and areas of low level signals.

10. The fiber optic rotary joint of claim 9, wherein a plurality of light receiving prisms is angularly spaced apart at a first angle, said areas of low level signals extending for a second angle greater than said first angle.

11. The fiber optic rotary joint of claim 9, wherein said reflective portions and said areas of low level signals have the same annular length.

12. The fiber optic rotary joint of claim 9, wherein each of said reflective portions and said areas of low level signals extend for an angle of approximately 45°.

13. The fiber optic rotary joint of claim 1, wherein said joint has a diameter of approximately 40 inches.

14. The fiber optic rotary joint of claim 1, wherein said light transmitters are located on one vertical plane and said light receivers are located on a second vertical plane spaced from said first plane.

15. The fiber optic rotary joint of claim 1, wherein air separates said plurality of light transmitters from said waveguide.

16. The fiber optic rotary joint of claim 1, further comprising a signal combiner for combining said plurality of received signals into a combined optical signal.

17. The fiber optic rotary joint of claim 16, further comprising a third plurality of optical fibers each coupled at one end thereof to a corresponding one of said light receivers and at an opposite end thereof to said signal combiner.

18. The fiber optic rotary joint of claim 1, wherein said first plurality of light transmitters emit optical signals at different wavelengths, $\lambda_1$ and $\lambda_2$.

19. The fiber optic rotary joint of claim 18, further comprising a signal combiner for combining said optical signals received by said light receivers and a dichroic filter for separating optical signals $\lambda_1$ and $\lambda_2$ from said signal combiner.

20. The fiber optic rotary joint of claim 1, wherein each of said first plurality of optical fibers is coupled at one end thereof to a corresponding one of said light transmitters and at an opposite end thereof to a light source.

* * * * *